US006420971B1

(12) United States Patent
Leck et al.

(10) Patent No.: US 6,420,971 B1
(45) Date of Patent: Jul. 16, 2002

(54) ELECTRONIC SEAL, METHODS AND SECURITY SYSTEM

(75) Inventors: Michael John Leck, Goostrey; John Edward Mason, Tarporley, both of (GB)

(73) Assignee: TRIpseal Limited, Surrey (GB)

( * ) Notice: Subject to any disclaimer, the term of this patent is extended or adjusted under 35 U.S.C. 154(b) by 0 days.

(21) Appl. No.: 09/598,947

(22) Filed: Jun. 22, 2000

(30) Foreign Application Priority Data

Jun. 23, 1999 (GB) ........................................ 9914711

(51) Int. Cl.[7] ........................................ B60C 23/00
(52) U.S. Cl. ........................ 340/542; 340/556; 340/571
(58) Field of Search ........................ 340/568.1, 568.2, 340/568.4, 568.7, 571, 572.8, 572.9, 825.72, 542, 543, 556, 425.5, 426, 427, 540; 70/38 A, 38 B

(56) References Cited

U.S. PATENT DOCUMENTS 4,447,123 A * 5/1984 Page et al. .................. 340/555
4,523,186 A * 6/1985 Fiarman ..................... 340/555
4,546,345 A * 10/1985 Naito ......................... 340/542
4,878,045 A * 10/1989 Tamaka et al. ............. 340/556
5,949,151 A * 9/1999 Nakajima .............. 340/825.72
5,963,131 A * 10/1999 D'Angelo et al. ....... 340/568.1
6,037,867 A * 3/2000 Joseph et al. ............... 340/508
6,040,763 A * 3/2000 Nakajima ................... 340/426
6,069,563 A * 5/2000 Kadner et al. .............. 340/571

* cited by examiner

*Primary Examiner*—Van Trieu
(74) *Attorney, Agent, or Firm*—John S. Hale; Gipple & Hale

(57) ABSTRACT

An electronic seal (2) is disclosed which comprises a housing (4,104) and a closure member co-operable with the housing to form a seal. The closure member may for example take the form of an elongate member (6, 106) connectable at both of its ends to the housing. The closure comprises an outer portion (8, 108) surrounding a core (10, 10A, 110). A sensor assembly (14, 16, 135, 136) is provided for sensing integrity of the core. Hence tampering with the seal can be detected. The core may be formed as a fiber optic cable (10, 10A with an integrity sensor comprising an optical source 14 and an optical detector 16.

25 Claims, 5 Drawing Sheets

ELECTRONIC SEAL, METHODS AND SECURITY SYSTEM

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

1. Field of the Invention

The present invention relates to an electronic seal capable of monitoring its own security state, for example an electronic seal for securing in a closed position a door or other closure closing an aperture allowing access to an enclosed space (e.g. a container). The invention also includes a seal capable of communicating with a reading and/or programming device.

2. Description of the Related Art

There exists a need to monitor the security status of cables, bands or other elongate members which form a loop or other connection either of themselves or when one or both ends thereof are fixed to a lock or seal. In particular, if the continuity integrity of the loop, connection or elongate member is broken b tampering, e.g. by cutting the cable, band etc. or by releasing the cable from the lock/seal, then there is a need to detect this.

Various solutions to this problem have been proposed. For example, a recently publicised "electronic tag" for criminals (The Times 29th January 1999) emits coded electric pulses every few seconds by radio frequency. If the securing strap is broken or tampered with, an alert code is transmitted to the monitor which sends an alarm to a control station. If the tag moves out of range of a monitor, an alarm is also sent to the control station.

The Crypta III device marketed by Encrypta Electronics Ltd. UK and described in publications EP 0,193,297 A1 and B1 monitors the receipt and release of the releasable end of a security cable into/from a recess in a housing. A random code generated by the receipt or release is displayed via an LED. However, this device cannot detect its cable being cut.

There are numerous electronic seals (for example, Electronic Seal PTE Ltd, Singapore; Sealtronic SA, Switzerland) which check for electrical continuity of a standard steel rope or cable. Tampering is assumed to break the electrical continuity of a steel security cable. However, it is believed that the circuit could be kept intact with a simple shunt cable while cutting the security cable, in which case the tampering would probably not be detected by the seal. Information is transmitted by radio frequency.

An application note published in 1992 by Dallas Semiconductor describes a tamper detection circuit completed by a loop of wire which is the centre conductor of a coaxial cable. The electrical continuity of the centre conductor is thereby monitored This arrangement prevents keeping the circuit intact with a simple shunt cable connected to the outer conductor of the coaxial cable while cutting the cable. However, two problems remain with this arrangement. Firstly, as electrical contacts with the cable are involved, the device is susceptible to electrical noise or being damaged by deliberate voltage spikes being applied to the cable. Secondly, it is still feasible that a thief could carefully peel back the outer sheath and central insulation of the device to expose the central conducting core. Shunt cables could then be provided by the thief for both inner and outer conductors of the coaxial cable so that the cable could then be cut while maintaining the electrical continuity of the tamper detection circuit.

The present invention aims to mitigate or solve one or more of the problems associated with the above-mentioned prior art devices.

Additionally or alternatively, the present invention aims to provide an electronic seal or system capable of/adapted to monitor/sense the integrity and/or continuity of (i) a closure member (e.g. an elongate member such as a cable, band, padlock hook, etc.) comprised in the seal or system and/or (ii) a security loop or other connection including/involving part or all of the closure member.

SUMMARY OF THE INVENTION

Additionally or alternatively, the present invention aims to provide an electronic seal or system capable of/adapted to monitor/sense the integrity and/or continuity of (i) a closure member (e.g. an elongate member such as a cable, band, padlock hook, etc.) comprised in the seal or system and/or (ii) a security loop or other connection including/involving part or all of the closure member.

First Aspect of the Invention

According to a first aspect of the present invention, there is provided an electronic seal comprising:

- a housing;
- a closure member cooperable with the housing to form a connection to close the seal,
- the closure member comprising an outer portion enclosing one or more inner cores; and
- means for sensing the integrity and/or continuity of some or all of the one or more inner cores.

The inventive seal has an advantage over the prior art Scaltronic and Electronic Seal PTE devices, which sense the electrical continuity of a standard cable, in that it is an inner core of the closure member rather tan the whole of the closure member whose integrity/continuity is sensed. This means that it is more difficult for a thief to cut the cable without the tampering being detected. In particular, attaching a shunt cable to the outer portion of the closure member. before cutting the closure member, to allow access to a container secured by the seal, would result in maintained continuity in the outer portion but a discontinuity in the inner core which would be detected; in contrast this procedure would avoid tamper detection in the Sealtronic devices as electrical continuity would be maintained by the shunt cable.

The closure member is preferably an elongate member. This allows easy threading through a hole in a member to be secured by the seal (e.g. a hole in a lug in a container closure mechanism). Also, the present invention is more useful with an elongate member which is more likely to be cut (see below).

The outer portion is merely limited by its enclosing one or more inner cores, and can include a or the central axis (which can be curved) of the closure member or elongate member when this is not occupied by the one or more inner cores.

Preferably, the connection is formed by formation of a closed loop including part or all of the closure member. The loop can be any shape, not merely a curved shape. Two or more portions (e.g. end portions) of the closure member (e.g. elongate member) can be connected to the housing to form the loop.

In an alternative embodiment, when the connection is formed only one portion (e.g. an end portion) of the closure member (e.g. a rigid or flexible elongate member, e.g. a bolt or cable) is connected to the housing. The closure member here preferably comprises an enlarged head (e.g. bolt head) attached to one end of an elongate portion (e.g. shaft, shank, cable etc) of narrower cross-section containing the inner core(s), an opposing end of the elongate portion being adapted to be received (e.g. by means of a screw connection) by a recess of the housing. For example, the inner corc(s) can comprise an optical fibre, one end of which is mirrored at the enlarged head, the other end of which is exposed at tie opposing end of the elongate portion (e.g. bolt shaft/shank). Alternatively, the inner core(s) can comprise a conductor forming part of or connected to a capacitor, one end of the conductor being exposed at the elongate portion opposing end for electrical connection to the seal when connected. The sensing means is preferably disposed inside, and/or is fixed to, the housing so as to communicate with the inner core(s) when connected. Here, the bolt shank or other closure member elongate portion could pass through a hole in a lug to seal a container without a loop having been formed.

Preferably, the sensing means is for sensing (or during use senses) opening of the seal after closure of the seal. More preferably, the seal is for sensing (or during use senses) the integrity and/or continuity of the connection, the loop (if present) and/or a communication path or paths (e.g. optical path or electrical circuit) including (e.g. between) the sensing means and the sensed inner core(s). In this way, the seal is able to detect illicit opening of the seal effected by releasing the closure member without cutting it, as well as being able to detect cutting of or tampering with the closure member itself.

Preferably, the sensing means is disposed inside and/or fixed to the housing.

Preferably, the housing is engageable with one, two or more portions (e.g. end portions) of the closure member, such that the housing forms or encloses part of the loop when formed.

In one embodiment, one or more portions (e.g. an end portion) of the closure member are fixed to the housing, and the housing is engageable with an engaging portion (e.g. end portion) of the closure member.

Preferably, the housing comprises one or more recesses adapted to receive an end portion of the closure member.

Preferably, the housing comprises one or more locks adapted to lock one, two or mote portions (e.g. one or two end portions) of the closure member in position when said portions are engaged with the housing. The one or more locks can comprise a sacrificial latching mechanism or a releasable lock or locks (e.g. a solenoid mechanism controlled by a microprocessor).

The one or more inner cores preferably extend along substantially all or most of the length of that portion of the closure member or elongate member which is disposed outside the housing when the seal is closed and which is included in the loop when formed. This substantially prevents the closure member or elongate member being cut without also cutting the inner core(s).

Preferably, the elongate member is flexible, but it can be rigid, e.g. in the form of a hook (as in a padlock hasp, for example).

Preferably, the elongate member comprises a cable.

Preferably, the outer portion of the cable or elongate member comprises metal (e.g. steel) wire or wires. More preferably, the outer portion comprises a plurality of inter woven strands of metal (e.g. steel) wire. This material imparts strength as well as flexibility.

In one embodiment, a single inner core is provided substantially coaxial with the outer portion of the closure member or elongate member.

In another embodiment, the elongate member (e.g. a cable) comprises a plurality of interwoven major strands (e.g. comprising metal wire), one, two or more of which being inner core-containing major strands each of which comprises a major strand outer portion (e.g. comprising metal wire, e.g. a plurality of interwoven minor strands of metal wire) enclosing one of the one or more inner cores. Where two or more inner-core-containing major stands are provided, then the integrity/continuity of each inner core is sensed, i.e. sensing occurs at two cross-sectional positions of the elongate member so that tampering with/cutting the elongate member in a manner avoiding detection by the sensing means becomes even harder.

Some or all of the one or more inner cores can comprise an inner loop extending outward from a or the fixed portion of the closure member to at or near a or the engaging portion of the closure member and back to the fixed portion. This is particularly preferred where the closure member is an elongate member (e.g. comprising a cable) including a plurality of interwoven major strands (e.g. as described above), a first strand comprising one inner core forming the outward portion of the inner loop, and a second strand comprising one inner core forming the backward portion of the inner loop. Remaining strands can be dummies containing inner cores not connected to the sensing means.

These embodiments are is harder to tamper with without detection as a person stripping the member does not know which strands are live and should be bypassed before cutting the member.

In an especially preferred embodiment of the invention, the one or more inner cores comprise one or more optical fibres, the sensing means comprises one, two or more optical detectors for sensing the integrity and/or continuity of some or all of the one or more optical fibres by detecting optical signals transmitted therealong, and the seal additionally comprises one, two or more optical sources for emission and transmission of optical signals into/along those of the one or more optical fibres which can be sensed. The optical detector (s) sense the optical properties of the optical fibre(s), which properties will change if the fibre(s) are cut or otherwise tampered with.

The above embodiment has the advantage that it is very hard to bypass the optical fibre core without changing the optical properties of the core radically, if such a bypass is possible at all. Tampering with or cutting the closure member is therefore almost always detected. This is favorably compared to the Dallas Semiconductor device in which the electrical continuity of the conducting core of the coaxial cable may be maintained by bypassing the core before cutting the cable (see above). A second advantage is that as there are no electrical contacts between the optical fibre(s) and the detector(s) or source(s), the seal is less susceptible to electronic noise or being damaged by deliberate voltage spikes being applied to the elongate member.

Preferably, the optical source(s) and/or optical detector(s) are part of the loop.

Preferably, the one or more optical fibres comprise an optical core of transparent optical material and an outer cladding enclosing the optical core. The transparent optical core preferably has a refractive index which varics from the inside to the outside of the optical core (e.g. a graded or stepped refractive index). This achieves internal reflection of an optical signal passing along. Preferably, the outer cladding comprises plastic (e.g. flexible plastic). The outer cladding is preferably opaque (e.g. black). The materials and methods of manufacture of the optical fibre are known to the skilled person.

Preferably, the ends of some or all of the one or more optical fibres are exposed at the surface of the closure member for communication with the optical detector(s) and/or optical source(s). Preferably, a first end of each optical fibre is exposed at a first end portion of the closure member and a second end of each optical fibre is exposed at a second end portion of the closure member.

Preferably, the seal comprises two means for both sensing and emitting optical signals (i.e. two combined optical sources/detectors) positioned for communication with opposing ends of some or all of the one or more optical fibres. This arrangement allows an optical signal to be transmitted in two directions along the relevant optical fibres, maximising the difficulty of detectionless tampering.

Whether or not optical fibres are used, the seal preferably comprises a microprocessor for receiving and processing data output by the sensing means relating to the integrity and/or continuity of the one or more inner cores (and preferably also relating to opening of the seal after closure) and for outputting said data and/or related data regarding the security status of the seal when required. The microprocessor is preferably suitable or adapted (e.g. via a suitable program) to receive and process the integrity/continuity data at different times, to compare each set of received data with one, some or all of the initial set or sets of integrity/continuity data obtained immediately after arming (or soon, e.g. 0–10 min e.g. 0–1 min, thereafter), and to detect tampering by detecting a difference between the initial post-arming data and data received after tampering (e.g. that representing a significant change in the optical and/or electrical properties of the closure member).

The microprocessor preferably also controls the production of conditions required for the sensing means to sense the integrity and/or continuity of the core(s) (and preferably also opening of the seal) at different times (preferably at regular intervals). For example, where the one or more inner cores comprise one or more optical fibres and optical source(s) are present, the microprocessor controls optical signal emission from the optical source(s) into the optical fibre(s). The microprocessor may also control the lock(s).

Preferably, a clock is provided so that times of sealing/locking, arming, disarming, scanning by distant devices, and/or tampering may be detected.

Preferably, the microprocessor is connected. to a memory for recording said integrity/continuity data Preferably, the memory is suitable for recording a unique identification number of the seal, the contents of a container secured by the seal, the times and dates on which the seal was closed, locked and/or armed, and/or the times and dates on which tampering of the seal was detected.

The microprocessor can be programmed to take the actions which it is suitable for taking. A program can be provided for this purpose.

The microprocessor and other electrical components are preferably powered by an electrical power source, preferably a battery (e.g. a lithium battery for long life). The power source is preferably internal to the housing, and may be either permanently sealed within the housing or accessible and/or replaceable, e.g. by maeans of a removable cover allowing access to and replacement of the power source. Having a power source, the seal is able to continually sense its own security state, unlike passive transponder seals which arc only able to do so when they are energised by a scanning device.

Preferably, the seal comprises a transmitter controllable by the microprocessor and capable of receiving integrity/continuity data and/or related security status data from the microprocessor, said transmitter being able to transmit signals containing said data to a reading and/or programming device distant or separate from the seal.

The transmitter is preferably able to transmit signals comprising electromagnetic radiation, more preferably visible and/or infrared (IR) radiation. The use of visible/IR communication gives additional security from eavesdroppers when compared to radio frequency (RF). In addition, IR/visible radiation is much more directional than RE, being given out and received within a restricted cone, and this allows a distant reading device more easily to locate which IR/visible transmitting seal is transmitting where several such seals are present, or to distinguish between several such seals each transmitting simultaneously.

Preferably, the seal comprises a detector for detecting signals from a reading and/or programming device distant or separate from the seal. Preferably, for the same reasons as above, the detector is able to detect signals comprising electromagnetic radiation, more preferably visible and/or infrared radiation.

Preferably, the seal is programmed such that when armed the transmitter emits signals (e.g. beacon signals) intermittently, the signals preferably being emitted at regular intervals (e.g. of about 0.1 to 1 second), though signals at random intervals within a fixed (e.g. 0.8–1.2 sec) time range may enhance security in certain applications. The intermittent transmission saves power and the beacon signals allow a distant reading and/or programming device searching for the signal to synchronise with the seal.

Some or all of the intermittently transmitted signals usually comprise one, two or more consecutive pulses (e.g. each about 10 $\mu$s long). In some cases the number of pulses in each signal, or the time gap (e.g. 10–20 $\mu$s) between each pulse, may vary depending on whether the seal has been tampered with or not. In this way a suitably programed reading and/or programming device can detect the security status of the seal without responding to it.

If the seal then detects an acceptable password in a second signal from the device within a predetermined period after one of the intermittently-transmitted signals was emitted, the seal is preferably programmed to enter subsequently into continuous two-way communication with the device (e.g. emitting detailed security status data, container contents data, etc).

Preferably, the seal is programmed such that, when armed, the seal intermittently activates (e.g. at regular intervals e.g. of about 0.1 to 1 second), senses the integrity and/or continuity of the one or more inner cores (and preferably also opening of the seal), detects whether tampering has taken place, transmits via the transmitter one of the intermittently transmitted signals, searches for an acceptable response from the device, and then if no such response is detected deactivates until the next time for re-activation occurs. In this way, the armed seal spends most of its time de-activated, only activating briefly for self-sensing, tamper detection, transmission and searching. This saves power and prolongs the life of the power source (e.g. battery).

There is an alternative to using one or more optical fibres as the one or more inner cores of the closure member.

In this alternative embodiment, he one or more inner cores comprise one or more inner conductors connected or connectable to a terminal of an electrical power, source, the one or more inner conductors being electrically insulated from each other and from the outer portion of the closure member;

the outer portion comprising a conductor connected or connectable to the opposing terminal of the power source;

the outer portion and the one or more inner conductors forming a capacitor or capacitors capable of storing charge provided by the power source;

and wherein the sensing means comprises a means for measuring charge and/or discharge characteristics of the capacitor or capacitors.

In this embodiment, the capacitance of the capacitor(s) depends on the length of the closure member. If the closure member were cot, then the charge/discharge characteristics of the member would change (e.g. the capacitance decreases, the decay/discharge curve changes, and the stored charge decays more quickly). The sensing means detects the change in the charge/discharge characteristics occurring during cutting.

One advantage that this embodiment has over the Dallas Semiconductor prior art device, which measures the electrical continuity of a conducting core of a coaxial cable, is demonstrated when a thief bypasses the conducting core(s) and the outer portion before cutting the cable (the closure member). In the prior art device, electrical conductivity may be maintained and detection may be avoided. In the present embodiment, bypass of the core(s) and outer portion would likely lead to a change in capacitance detectable by the sensing means.

Again, it is preferable that the closure member is an elongate member. This allows easy threading through a hole in a member to be secured (e.g. a hole in a lug in a container closure mechanism). A change in capacitance or discharge/charge characteristics is also more easily detectable when an elongate member is cut or tampered with.

Preferably, the means for measuring charge and/or discharge characteristics of the capacitor(s) is adapted to measure the capacitor voltage remaining and/or the discharge current flowing at different times during discharge. The sensing means may measure the decay of the capacitor voltage during discharge, The one or more inner conductors and the outer portion conductor are usually connected Or connectable to their respective power source terminals indirectly, e.g. via an input/output device and/or a microprocessor.

Preferably, the microprocessor (e.g. as described above) of the seal comprises an input/output connector or connectors, connected or connectable to the capacitor(s), switchable between an output mode in which the capacitor(s) are charged up and an input mode in which the capacitor(s) are discharged into the microprocessor which senses the discharge characteristics of the capacitor(s).

Preferably, in the capacitance version of the invention, the inner conductor(s) and the conducting outer portion are connected or connectable to the power source via a portion (e.g. an end portion) of the closure member fixed to the housing, and the housing is engageable with an engaging portion (e.g. end portion) of the closure member.

The engaging portion of the closure member may be engageable with (e.g. slidably engageable within) a charge-storing portion of the housing such that the charge-storing portion contributes to the capacitance of the capacitor(s) when the engaging portion is so engaged. In this way, there will be a measurable change in capacitance if a thief releases the closure member (opens the seal) without cutting it.

The engaging end portion of the closure member or elongate member preferably carries a higher capacitance per unit length than that of the remaining portions of the closure member or elongate member. Thus, if the closure member or elongate member is cut near to the engaging end portion, the change in capacitance and charge/discharge characteristics will be significant and readily measurable by the sensing means.

Second Aspect of the Invention

According to a second aspect of the present invention, there is provided a method of sensing the security status of an electronic seal according to the first aspect of the present invention, comprising the steps of:

(a) sensing the integrity and/or continuity of some or all of the one or more inner cores (and optionally also a communication path or paths including the sensing means and the sensed inner core(s)) at a certain time after closure and arming of the seal; and (b) if the integrity and/or continuity of any of the sensed core(s) (or optionally the path or paths) has been compromised, recording that fact and/or that tampering has occurred.

Preferably, the method comprises the additional steps of:

(c) comparing the integrity and/or continuity data obtained in step (a) with previously recorded data representative of or obtainable from the sensed core or cores when in an integral state and optionally also from the sensed path or paths when continuous;

(d) detecting whether or not the data obtained in step (a) differs from the compared previously recorded data in a predefined manner and/or by more than a predefined extent; and (e) if the data obtained in step (a) does so differ, recording that fact and/or that tampering has occurred and/or that the integrity/continuity has been compromised.

In step (c), the previously recorded data can comprise data with which the seal is provided without having been generated by self-sensing by the seal of the core(s) and optionally the path(s) (e.g. pre-programmed data).

Preferably, however, in step (c), the previously recorded data comprises that obtained at a defined preceding time after closure and arming of the seal.

In these ways, the method allows sensing of whether or not the properties (e.g. electrical and/or optical properties) of the closure member core(s), and optionally also ale communication pat(s), have changed significantly from when the seal was secured/closed and armed. Such a change will usually indicate tampering has occurred.

Preferably, in step (c), the previously recorded data comprises some or all of the initial set or sets of integrity/continuity data obtained immediately after arming or soon (e.g. less than 10 minutes or less than one minute) thereafter. This ensures that the basis for comparison is when the seal was in a secure untampered state.

Preferably, step (a) comprises sensing the integrity, continuity and/or optical properties of one or more optical fibres comprised in the one or more inner cores. This optical sensing method has the advantages of difficulty of by-passing and of low susceptibility to electronic damage as described above.

More preferably, step (a) comprises sensing the integrity, continuity and/or optical properties of one, two or more optical paths, each optical path including one of the one or more optical fibres, and an optical detector with which that optical fibre in optical communication.

Optionally, some or all of the paths can include a medium between that optical fibre and the optical detector allowing said optical communication. The medium can comprise a body of gas (e.g. air) and/or one or more transparent solid materials (e.g. covering the detector). The optical detector is preferably part of the loop (if present). In these ways, there is sensing not only of the integrity of the optical fibre(s) but also of the continuity of the optical path(s) or loop formed when the seal is closed. Therefore, not only cutting of or tampering with the closure member but also illicit opening of the seal without tampering with the closure member can be detected.

Even more preferably, step (a) comprises transmitting an optical signal from an optical source forming part of the seal into one portion (e.g. end portion) of some or all of the one or more optical fibres, and detecting whether or not a signal is received by the optical detector via another portion (e.g. end portion) of those fibre(s).

Two or more optical paths may be defined by two or more optical fibres communicating with the same optical detector.

In an alternative embodiment, step (a) comprises sensing the charge and/or discharge characteristics of a capacitor or capacitors comprised in the closure member.

The characteristics of the capacitor(s) can be as described hereinabove in the relevant embodiment of the seal.

Preferably, the method comprises measuring the capacitor voltage remaining and/or the discharge current flowing at different times during discharge. In this way, a decay curve is measured.

Preferably, the method comprises charging up the capacitor(s), and allowing the capacitor(s) to discharge while measuring the discharge characteristics of the capacitor(s).

Irrespective of which sensing embodiment is used, sensing the integrity/continuity can occur at regular intervals (e.g. of about 0.1 to 1 second).

Preferably, the method also comprises the seal transmitting signals intermittently to or for receipt by a reading and/or programming device distant or separate from the seal. The intermittent transmission saves power (e.g. maximising battery life).

Preferably, the intermittently-transmitted signals comprise beacon (guide) signals. Those allow a distant reading and/or programming device searching for the signal to synchronize with the seal.

"Transmit" can include "emit" or "send out" without necessarily implying receipt by the device.

More preferably, the signals transmitted intermittently comprise electromagnetic radiation from a transmitter comprised in the seal.

Even more preferably, for additional security and directionality, the signals transmitted intermittently comprise visible and/or infrared radiation, and/or the transmitter is adapted to transmit visible and/or infrared radiation.

Preferably, the intermittently-transmitted signals are transmitted at regular intervals (e.g. of about 0.1 to 1 second). This aids synchronization. Alternatively, the intermittently-transmitted signals are transmitted at random or irregular intervals within a fixed time range (e.g. 0.8–1.2 sec); this may enhance security in certain applications).

Some or all of the intermittently-transmitted signals usually comprise one, two or more consecutive pulses (e.g. each about 10 $\mu$s long). In some cases the number of pulses in each signal, or the time gap (e.g. 10–20 $\mu$s) between each pulse, may vary depending on whether the seal has been tampered with or not. In this way a suitably programmed reading and/or programming device can detect the security status of the seal without responding to it.

Preferably, the method comprises activating the seal before steps (a) and (b) or (a) to (e), transmitting one of the intermittently transmitted signals, and deactivating the seal until the next time for re-activation occurs. This saves power. More preferably, the activation, sensing, transmission and deactivation occurs at regular intervals. This aids synchronisation by the distant reading and/or programming device.

Preferably, the method comprises searching for a second signal (egg in reply to one of the intermittently-transmitted signals) transmitted from the reading and/or programming device.

Preferably, for security and directionality, the searching step utilises a visible and/or infrared detector.

Preferably, the searching step takes place during a predetermined period after transmission of one of the intermittently-transmitted signals by the seal and before deactivation of the seal. More preferably, the searching step lasts 1 $\mu$s to 100 ms, more preferably 1 $\mu$s to 10 ms. This minimises the time during which the seal is activated, and saves power.

Preferably, if the second signal from the reading and/or programming device is detected, then the second signal received is recorded and/or if the second signal is acceptable deactivation is delayed until communication between the seal and the device is completed.

Preferably, the method of sensing includes receipt by the seal of a second signal from the device containing a password device, checking by the seal that the device password is acceptable, and subsequently transmitting a third signal containing password-protected data stored by the seal (e.g. security status data) from the seal to the device only if the password is acceptable. This is for security reasons. The data transmitted in the third signal is usually determined by the security level of the password received from the device.

Usually, the transmission of the third signal will form part of a continuous two-way communication between the scal and the device.

Preferably, the signals transmitted intermittently and/or the third signal is/are encrypted, e.g. using rolling encryption.

Third Aspect of the Invention

According to a third aspect of the present invention, there is provided an electronic seal comprising:

a housing;

a closure member cooperable with the housing to form a connection to close the seal; and a transmitter for transmitting signals containing data relating to the seal to a reading and/or programming device distant or separate from the seal.

Preferably, the seal comprises means for sensing the integrity and/or continuity of the closure member.

Preferably, the connection is formed by formation of a closed loop including part or all of the closure member. The sensing means is preferably for sensing opening of the seal after closure, more preferably for sensing the integrity and/or continuity of the connection, the loop (if present) and/or a communication path or paths including (e.g. between) the sensing means and the closure member.

Preferably, the closure member is an elongate member (e.g. comprising a cable).

The transmitter is preferably able to transmit signals comprising electromagnetic radiation, more preferably visible and/or infrared radiation. Visible/IR signals give additional security from eavesdroppers and are more directional than RF signals, as discussed above.

Preferably, the seal is programmed such that when armed the transmitter emits signals (e.g. beacon signals) intermittently, preferably at regular intervals (e.g. about every 0.1 to 1 second). This allows the device to synchronise with it and saves power.

Preferably, the seal is programmed such that when armed, the transmitter emits a third signal containing password-protected data (e.g. data relating to the security status of the seal, the time(s) of any tampering, container contents data, etc) only after receipt of a second signal from the device containing a password acceptable to the seal.

Preferably, the seal is programmed such that, when armed, the seal intermittently activates, senses the integrity and/or continuity of the closure member (and preferably also the path(s)), detects whether tampering has taken place, transmits via the transmitter one of the intermittently transmitted signals, searches for an acceptable response from the devicc, and then if no such response is detected deactivates until the next time for re-activation occurs. In this way, the armed seal spends most of its time de-activated, only activating briefly for self-sensing, detection and transmission. This saves power and prolongs the life of the power source (e.g. battery).

Preferably, the closure member comprises an outer portion enclosing one or more inner cores and the sensing means is for sensing the integrity and/or continuity of some or all of the one or more inner cores.

Other preferable features of the third aspect of the invention are as described hereinabove, being preferable features of the first aspect of the invention, all necessary changes being made.

Fourth Aspect of the Invention

According to a fourth aspect of the present invention there is provided a method of communication for a seal as defined in the first or third aspects of the invention comprising transmitting signals intermittently from a transmitter forming part of the seal to or for receipt by a reading and/or programing device distant or separate from he seal. This saves power (e.g. maximising battery life) compared to a continuous transmission.

"Transmit" can include "emit" or "send out" without necessarily implying receipt by the device or similar.

Preferably, the intermittently-transmitted signals comprise beacon signals (guide signals). These allow a distant reading and/or programming device searching for the beacon signals to synchronise with the seal.

Preferably, the intermittently-transmitted signals comprise electromagnetic radiation, more preferably visible and/or infrared radiation. Visible/IR signals give additional directionality and security from eavesdroppers.

Preferably, the intermittently-transmitted signals are transmitted at regular intervals This helps the device to synchronise with it.

Alternatively, the intermittently-transmitted signals may be transmitted at irregular or random intervals within a fixed time range (e.g. 0.8–1.2 sec).

Preferably, the signals are transmitted at intervals (regular or otherwise) of about 0.1 to 1 second. This is desirable to minimise power drain (which becomes significant for transmission at less than 0.1 second intervals) while also eliminating the risk of a dextrous thief opening and closing the seal between transmissions (which is possible for intervals of greater than about 1 second).

Some or all of the intermittently-transmitted signals usually comprise one, two or more consecutive pulses (e.g. each about 10 $\mu$s long). In some cases the number of pulses in each signal, or the time gap (e.g. 10–20 $\mu$s) between each pulse, may vary depending on whether the seal has been tampered with or not. In this way a suitably programmed reading and/or programming device can detect the security status of the seal without responding to it.

Preferably, the method comprises sensing the integrity and/or continuity of the closure member, detecting whether tampering has taken place, and then transmitting one of the intermittently-transmitted signals.

Preferably, the method comprises activating the seal before transmission of one of the intermittently-transmitted signals (and optionally before sensing) and de-activating the seal after transmission. Even more preferably, the process is repeated several times, preferably at regular intervals (e.g. of about 0.1 to 1 second).

In this way, the armed seal spends most of its time de-activated, only activating briefly for self-sensing, detection and/or transmission. This saves power and prolongs the life of the power source.

Preferably, the method of communication includes transmitting a second signal (preferably an IR or visible signal) from the device to the seal (e.g. in reply to the seal), preferably during a predetermined period (e.g. 1 $\mu$s–100 ms, e.g. 1 $\mu$s–10 ms) after transmission by the seal of one of the intermittently-transmitted signals and before deactivation of the seal.

More preferably, the second signal from the device to the seal contains a password of the device, and the method of communication includes checking by the seal that the device password is acceptable, and subsequently transmitting a third signal containing password-protected data stored by the seal (e.g. security status data) from the seal to the device only if the password is acceptable This is for security reasons.

The data transmitted ill the third signal is usually determined by the security level of the password received from the device.

Usually, the transmission of the third signal will form part of a continuous two-way communication between the seal and the device.

Preferably, the third signal contains data relating to the seal.

Preferably, the third signal contains data relating to the security status of the seal (e.g. data regarding the integrity/continuity of the closure member, or data derived therefrom), and/or the time(s) of any tampering.

Alternatively or additionally, at the same or different times, the third signal can contain the time(s) of arming and/or locking of the seal, a seal identification number, and/or the contents of a container secured by the seal. Time(s) of reading of the seal by reading device(s) may also be transmitted.

Preferably, the intermittently-transmitted signals and/or the third signal is/are encrypted, e.g. using rolling encryption.

Other preferable features of the method of communication are as defined in the preferable or essential features of the other aspects of the invention, all necessary changes being made.

Fifth and Sixth Aspects of the Invention

According to a fifth aspect of the invention, there is provided a security system comprising (i) an electronic seal according to the first or third aspects of the invention, and (ii) an electronic reading and/or programming device distant or separate from the seal for communication with the seal.

According to a sixth aspect of the invention, there is provided an electronic reading and/or programming device suitable or adapted to (e.g. programmed to) communicate with a distant or separate electronic seal according to the first or third aspects of the invention.

Communication can be one-way in either direction, or two-way.

In the fifth or sixth aspects of the invention the device can be a programing device (e.g. arming device) capable of arming or disarming the seal and/or locking or unlocking the seal. This programming device preferably is adapted to itself be disarmed on arming and/or locking of the seal by receipt of a signal from the seal which erases a password of the device, receipt and recognition of the device password by the seal being necessary to arm and/or lock the seal. This embodiment represents a cheap single-use item which can be widely distributed at goods distribution depots and is simple to use. Preferably, this type of device and the seal each have an outer conducting surface (e.g. sensor surface) capable of being brought into contact with each other so that signals can pass therebetween.

Preferably, the device is a reading device comprising a device detector for receiving transmissions from the seal and a device microprocessor for receiving and processing data relating to the security status of the seal. This allows distant/remote monitoring of the security status of the seal.

More preferably, the device is a reading and programming device which also comprises a device transmitter for transmitting signals to the seal, and wherein the device microprocessor is for controlling (e.g. arming or dis-arming) the seal via the device transmitter. This provides a versatile device capable of both controlling and monitoring the seal.

Most preferably, the device is programmed to search on instruction for beacon (guide) signals transmitted intermittently from the seal and, if such a signal is detected by the device detector, to transmit a second signal (e.g. including a password) via the device transmitter to the seal within a predetermined period after detection.

The device microprocessor can be programmed to take the actions which it is suitable for taking.

Preferably, the reading and/or programming device also includes input means (e.g. a keypad) for input of instructions by an operator of the device and/or output means (e.g. a display) for output of data to the operator.

Preferably, the device detector is able to detect visible and/or infrared radiation. Preferably, the device transmitter is able to transmit visible and/or infrared radiation The use of IR/visible communication increases security and directionality compared with R.F.

Preferably, the reading and/or programming device has an electronic memory containing or recordable with a password and/or a unique device identification number for transmission to and/or recordal by the seal.

Preferably, the device comprises an information input means (e.g. a connector or detector) for receiving encrypted information from a remote computer. This allows the random generation of passwords and codewords by the (secure) remote computer and their transmission from the computer to the device without their being known to any human operators. This eliminates collusion.

Specific embodiments of the present invention will now be described, by way of example only, with reference to the accompanying drawings, in which:

DETAILED DESCRIPTION OF THE INVENTION

Figure 1:
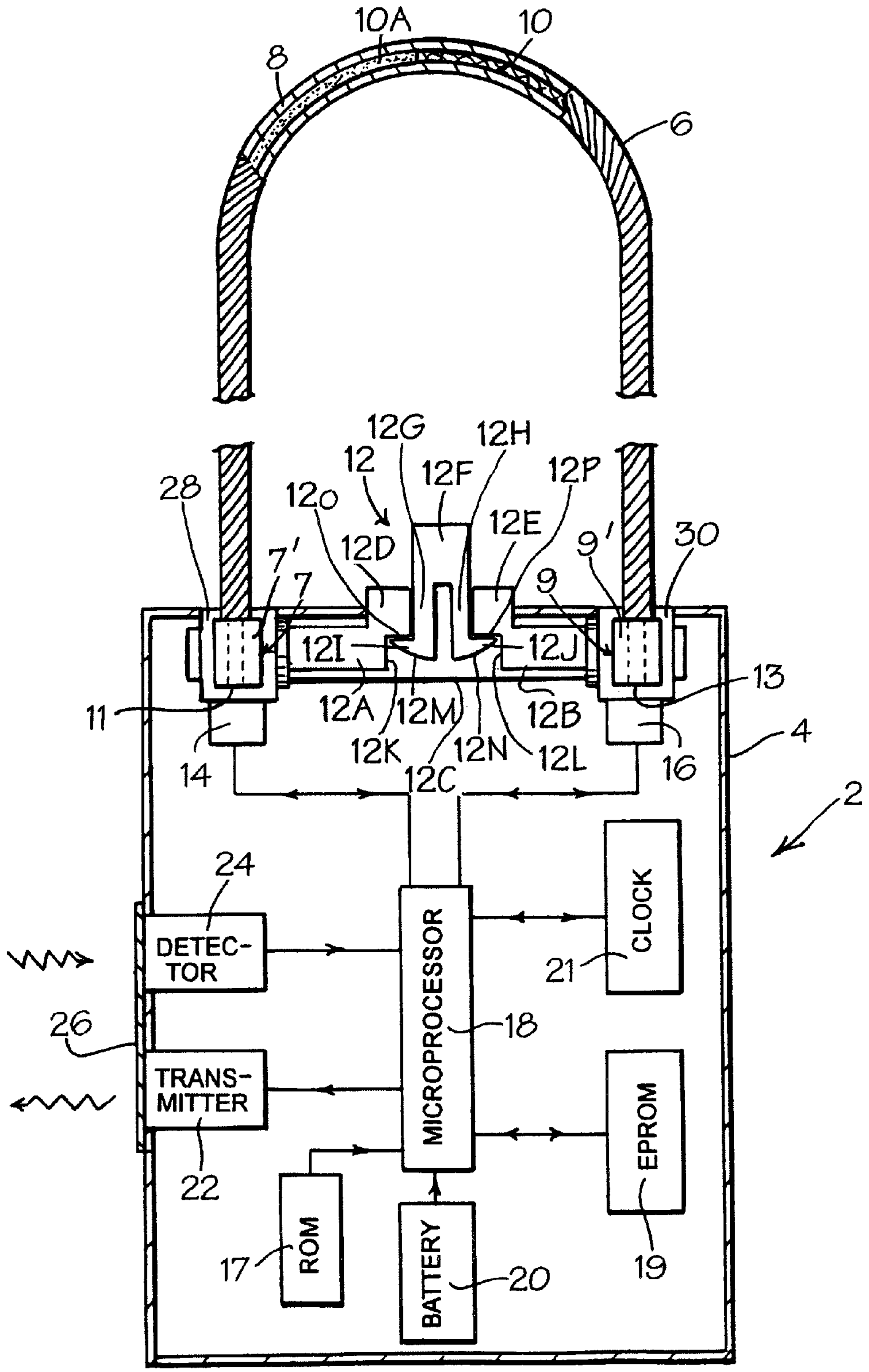
FIG. 1 is a cross-sectional view through a first embodiment of electronic seal in accordance with the present invention.

One end of the housing 4, which may comprise plastic and/or metal, is provided with two spaced apart recesses 28, 30, each forming a socket for receipt of a respective one of the two cable ends 7,9, as shown in FIG. 1. The housing also contains means for securing the housing 4 to a body of a container or to a door or other closure closing an aperture to the container. The housing can be screwed or welded to the container or closure.

The housing 4 also contains a lock 12 comprising a sacrificial latching/locking mechanism adapted to lock each of the cable ends 7 and/or 9 in position when received within their respective recess 28,30. The lock 12 includes two lock members 12*a*, 12*b* reversibly movable between (i) a locked position, in which cable end 7 when received within recess 28 is locked in position by one lock member 12*a* and in which cable end 9 when received within recess 30 is locked in position by the other lock member 12*b*, and (ii) an unlocked position in which one or both of the ends 7,9 of the cable 6 can be moved into and out of their respective recesses 28 and/or 30.

The two lock members 12*a*, 12*b* comprise elongate bars movably mounted in a slot 12*c* in the housing 2 between the recesses 28,30, said elongate bars 12*a*, 12*b* being mounted and movable transversely to the longitudinal axis of their respective cable ends 7,9, each bar 12*a*, 12*b* including an outer end engageable with its respective cable ends 7,9 and an inner end 12*d*,12*e* projecting outside the housing 4 to allow movement of the lock members 12*a*, 12*b* by hand. In the unlocked position, the inner ends 12*d*,12*e* of the lock members 12*a*, 12*b* abut each other (not shown). In the locked position (illustrated in FIGS. 1 and 2), the inner lock member ends 12*d*, 12*e* are spaced apart to their maximum extent, exposing a gap therebetween.

A deformable elongate sacrificial lock member 12*f* (usually of rectangular or square cross section) is also provided, comprising two parallel elongate resilient legs 12*g*, 12*h* projecting in the same direction from the main portion thereof. The ends of the legs 12*g*, 12*h* are provided with laterally outwardly-projecting locking portions 12*i*, 12*j* adapted to latch into inwardly-facing undercuts 12*k*, 12L of the moveable lock member ends 12*d*, 12*e*. The lower (forward) faces 12*m*, 12*n* of the projecting leg portions 12*i*, 12*j* are upwardly/rearwardly inclined relative to the legs 12*g*, 12*h*; this ensures that when the sacrificial member 12*f* is inserted into the gap between the moveable lock member ends 12*d*, 12*e* with the legs 12*g*, 12*h* forwardmost/innermost to the housing the legs 12*g*, 12*h* are deformed laterally inwardly to allow movement of sacrificial member 12*f* into the slot 12*c*, then springing outwards again when the projecting leg portions 12*i*, 12*j* are seated in the undercuts 12*k*, 12L.

The upper (rearward) faces 12*o*, 12*p* of the projecting leg portions 12*i*, 12*j* (i.e. those faces which engage with undercuts 12*k*, 12L) are perpendicular (alternatively upwardly/rearwardly inclined) relative to the legs 12*g*, 12*h*; this ensures that the sacrificial lock member 12*f* is held within the slot 12*c* after insertion.

When inserted into the slot, the junction between the legs 12*g*, 12*h* and the main portion of the sacrificial member 12*f* is level with or marginally (e.g. 1 or 2 mm) higher than the top surfaces of the projecting ends 12*d*, 12*e* of the adjacent moveable lock members 12*a*, 12*b*. This allows "sacrificial" cutting of a leg when the lock member 12*f* is inserted but prevents the legs from being squeezed together which could otherwise allow the projecting leg portions 12*i*, 12*j* to be disengaged from their associated undercuts, thereby allowing removal of the lock member without cutting.

The sacrificial lock member 12*f* thereby prevents movement of the lock members 12*a*, 12*b* to the unlocked position and locks the seal 2. The lock 12 can only be released and the seal 2 can only be opened by cutting the sacrificial member 12*f* and removing the parts thereof from the gap between lock member ends 12*d*, 12*e*.

The flexible coaxial cable 6 has an outer sheath 8, formed from a plurality of woven (entwined) strands of steel wire (e.g. stainless steel or high-tensile steel) or formed from some other conventional material. The sheath 8 encloses a central core comprising an optical fibre 10,10A made of conventional materials (e.g. plastics such as polymethyl methacrylate or glass) and made using methods known to the skilled person. The optical fibre 10,10A comprises a transparent core 10 enclosed by a thin cladding layer 10A. The cladding 10A acts as a protective barrier material between the outer sheath 8 and the transparent core 10 of the optical fibre, and is black. The integrity of the optical fibre 10 can be checked at regular intervals by the seal 2 (see below).

Figure 3:
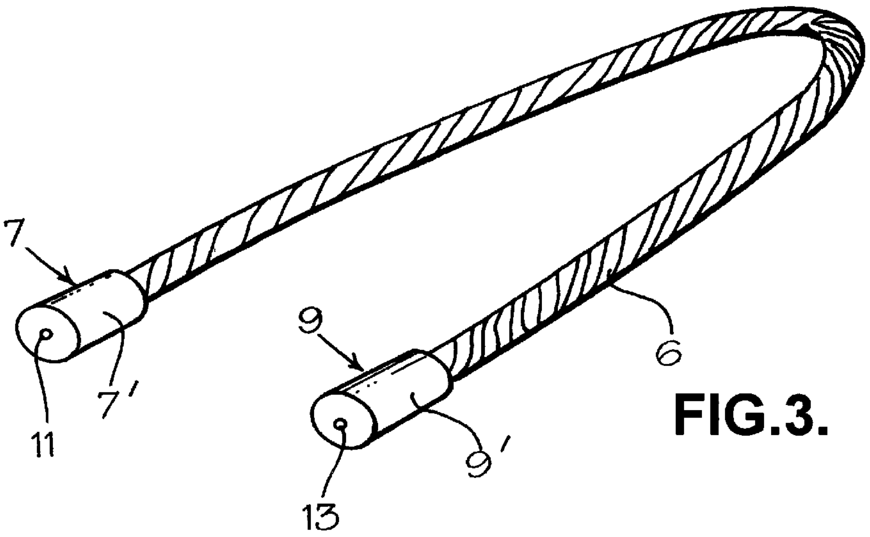
FIG. 3 is a perspective view of a coaxial cable forming part of the electronic seal of FIG. 1.

At both ends 7,9 of the cable 6, the ends 11, 13 of the optical fibre 10 are exposed as shown in FIG. 3. When cable end 7 is fully received within recess 28, the optical fibre end 11 is in contact with and/or communicates with a first combined optical source and optical detector 14. When the end 9 of the cable 6 is fully received within recess 30, the optical fibre end 13 is in contact with and/or communicates with a second combined optical source and optical detector 16 This arrangement allows an optical signal or beam to be emitted by the first source/detector 14, transmitted in one direction via the fibre 10, and detected by the second source/detector 16, and vice vic[0085] versa. This allows sensing of the optical properties of the cable optical fibre 10, as described hereinafter. Alternatively, for uni-directional signal transmission, 14 can just be a source and 16 a detector, or vice versa. Bi-directional optical signal transmission maximises the difficulty of tampering.

Referring to FIG. 1, the housing 4 also contains a microprocessor 18, a read-only memory (ROM) 17 upon which is written a program for the microprocessor, a clock 21 and an erasable programmable read-only electronic memory (EPROM) 19. The memory 19 stores an identification serial number 15 (FIG. 2) unique to the seal 2 incorporating hidden check sums and/or passwords, and when the seal 2 is armed as will be described, the memory 19 records in encrypted and password-protected form information about the contents of the container being secured as well as the time of sealing and arming. The seal serial number 15 may also be printed on the outside of the seal housing 4.

The microprocessor 18 controls signal emission from, and monitors signal detection by, the optical sources/detectors 14,16 and on the basis of the emitted and/or received signals, determines the condition of the cable. The microprocessor 18 also records in memory 19 the processed security status data, and (optionally) controls the lock member 12 so as to secure or release one or both ends 7,9 of the cable 6. The microprocessor 18 also controls a beacon, transmitter or source 22 comprising a visible and/or infrared (IR) transmitter, and a visible and/or infra-red detector 24, for two-way communication 35 with a separate external reading/programming device 40 (see later). Transmitter 22 and detector 24 are disposed within the housing 4 adjacent to an optical window 26, made of conventional materials, in the wall of the housing 4, such that visible and/or IR radiation can pass into and out of the housing to the detector 24 or from the transmitter 22.

The microprocessor 18, lock 12, source/detectors 14, 16, transmitter 22 and visible/IR detector 24 are powered by a battery 20. The battery 20 is internal to the housing 4, but alternatively could be located externally for some applications. The battery 20 is usually an alkaline battery for a high power output and for safety, though a lithium battery can be used for longer life. The battery may be permanently sealed within the housing 4 or alternatively may be removable via a removable cover in the housing allowing access to and replacement of the battery.

The various components of the electronic seal 2 are connected by electronic circuitry (e.g. a data bus) and via input/output devices (not shown) where appropriate (e.g. for the source 22 and detector 24) but since these are conventional they need not be described further.

Figure 2:
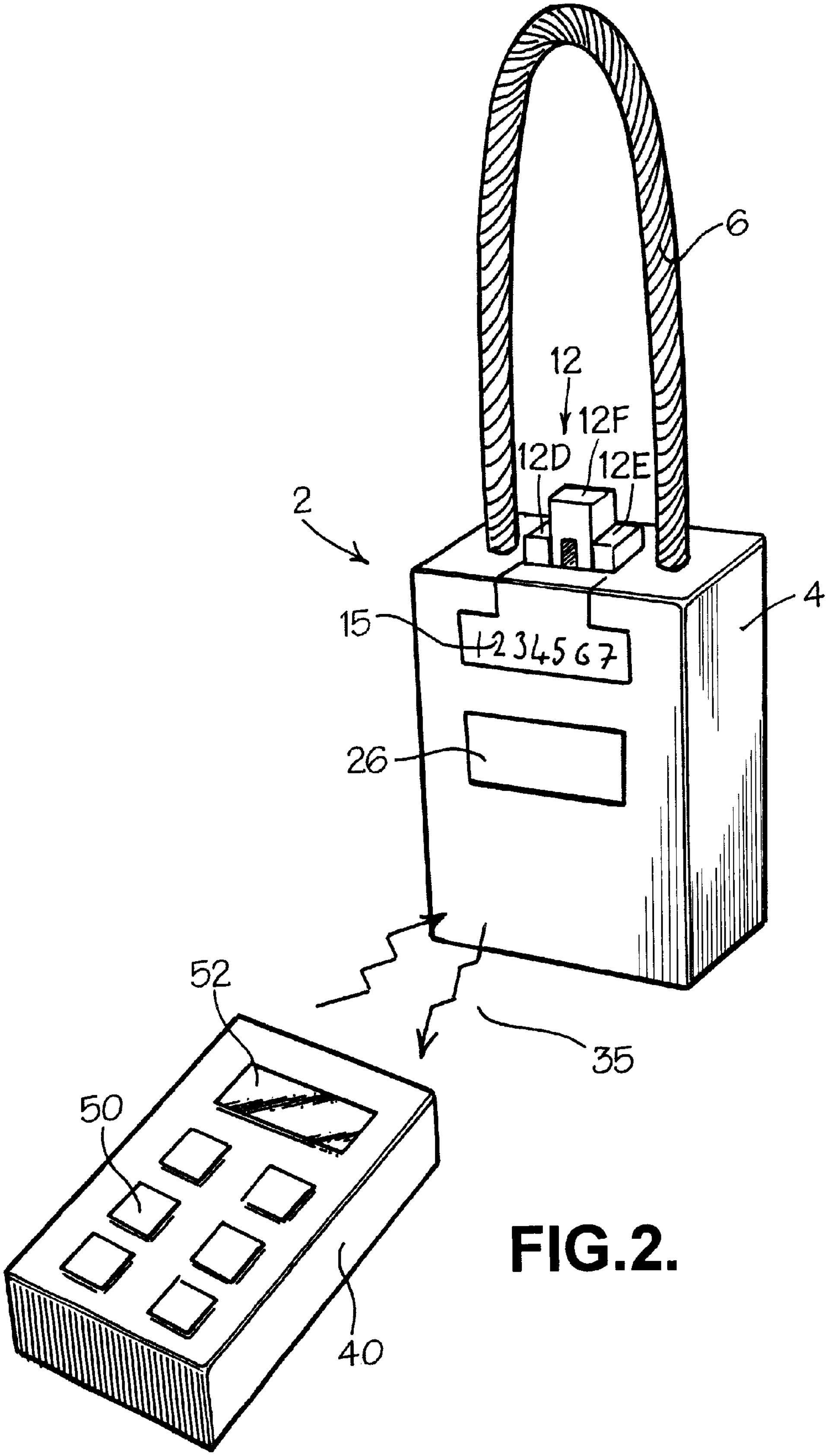
FIG. 2 is a perspective view of the electronic seal of FIG. 1, additionally illustrating a reading/programming device.
Figure 4:
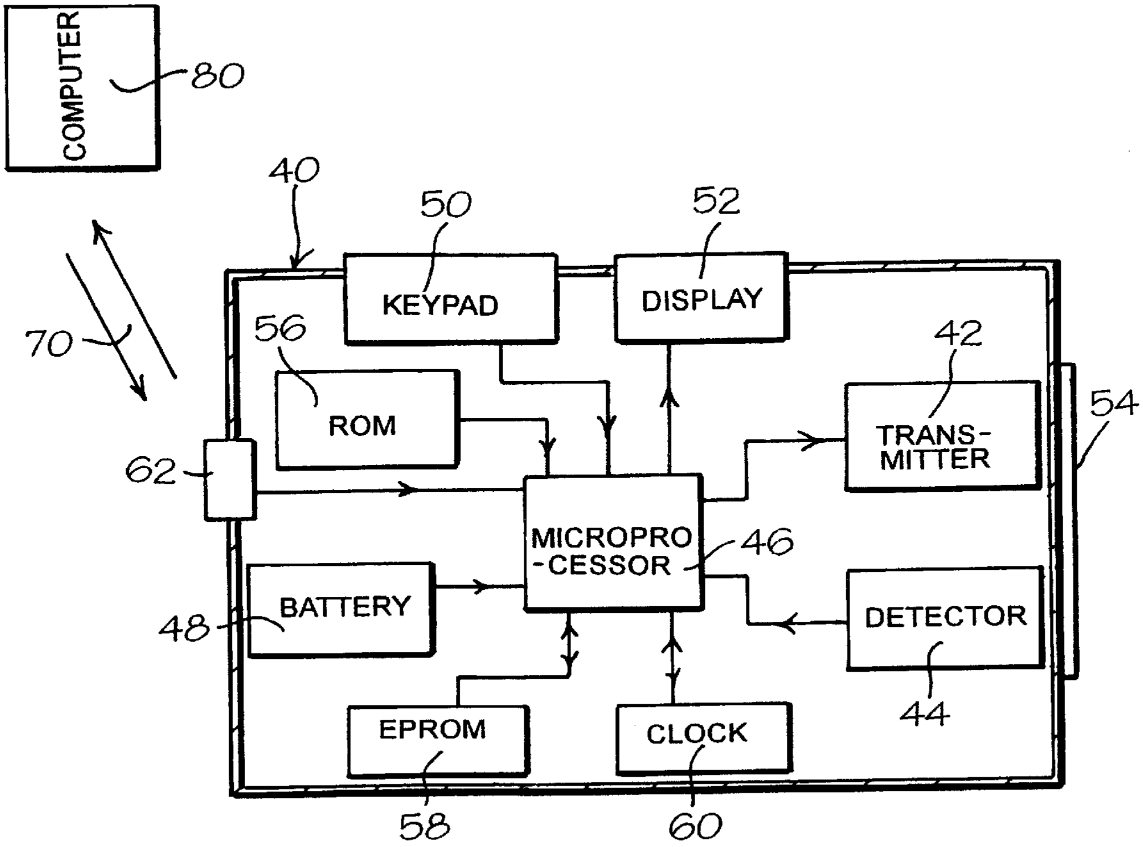
FIG. 4 is a diagrammatic sectional view of the device illustrated in FIG. 2.

The electronic seal 2 can communicate in two directions via its transmitter 22 and its detector 24 with a separate electronic reading and programming device 40, as shown in FIGS. 2 and 4. This device 40 has a visible and/or infra-red transmitter 42 and an visible and/or infra-red detector 44, operated by a microprocessor 46 controlled by a suitable program held on ROM 56 and connected to an erasable programmable read-only memory 58 (holding a serial number unique to the device 40) and clock 60, and the whole connected by conventional circuitry and powered by a power source (e.g. a battery) 48 The device 40 also has a keypad 50 for input of data by the operator, and a visible display 52 for communication of output data to the operator, both connected to the microprocessor 46. Input/output means (e.g. a connector or detector) 62 is provided for receiving and transmitting encrypted information 70 from or to a remote computer 80.

The seal 2 and reading/programming device 40 operate as follows, with particular reference to the use of the seal 2 to seal the door or shutter of a vehicle or container, which may contain valuable goods.

In use of the seal 2, after the vehicle or container has been loaded and the door or shutter closed, the cable 6 is passed through an aperture in a lug, projection, catch or other device used to fasten the door or shutter (not shown), so th the door or shutter cannot be opened without withdrawing or cutting the cable 6. The cable ends 7 and 9 are located fully within recesses 28 and 30 respectively and locked in position by means of the lock 12.

The seal 2 is armed and locked as follows. The reading/programming device 40 (either hand-held or attached to the wall of (e.g. a gatehouse) is brought within a few metres of the seal 2 (or vice versa). The operator directs the device window 54 towards the seal window 26 and actuates the keypad 50 (according to a set of instructions) to cause the microprocessor 46 to instruct the device's IR/visible transmitter 42 to send an IR and/or visible radiation signal, encrypted using rolling encryption, to the seal 2. This signal from the device 40 contains the unique serial number of the device 40 as well as a password accepted by the seal 2, instructions for the seal 2 to arm (and/or lock) itself, and information (typed in by the operator or otherwise provided) concerning the contents of the container sealed.

The signal passes through the optical window 26 of the seal 2, is detected by detector 24 and is translated and transmitted thereby to the seal microprocessor 18. The microprocessor 18 de-encrypts the signal, checks against its memory 19 to sec if the received password is acceptable, and if so records the serial number of the device 40, the contents of the container and the time, causes the seal to arm itself and (if the lock 12 is a solenoid) the lock to engage the cable ends 7,9. The seal 2 then sends a return acknowledgement signal back to device 40, which records this.

According to one mode of sensing seal integrity, upon arming of the seal 2 the microprocessor 18 instructs each detector 14,16 to take a background reading at regular or pseudo-random intervals (e.g. every 1 second or thereabouts). Immediately after such a reading, the microprocessor 18 instructs each of the optical sources/detectors 14,16 to emit an optical signal along the fibre optic core 10 of the cable 6, and to thereafter take a second reading of any optical signal received from the other optical source/detector via the fibre optic cable 10. The background reading is subtracted from the second reading, to give a final reading which is compared with previous such readings. If acceptable final readings (i.e. similar to previous readings) are received by both detectors, the detectors inform the microprocessor 18 of this, which makes no record in its memory. If no signal (or a defective or indeterminate signal or a signal substantially different to those received before) is received from either detector, however, then the microprocessor 18 instructs the sources 14,16 to emit a second optical signal and the above procedure is repeated. If the same is a similar reading/signal is received then the optical fibre 10 or cable 6 or seal 2 has probably been tampered with and the processor 18 records in memory 19 (a) the time, (b) the detector(s) which received the defective/different optical signal and (c) that the security status of the seal is "tampered with".

An alternative mode of sensing seal integrity, which is particularly suitable for embodiments utilising fibre optic cores, involves emission of a time varying signal into the optical fibre 10 from the optical source 14. This time varying signal may simply be a pulsed signal. The microprocessor 18 monitors the output from the optical detector 16 in order to establish whether it receives a correspondingly time varying signal. In the event that it does not, the microprocessor 18 again records in the memory 19 the items a–c mentioned in the previous paragraph.

Whichever of the above described modes of integrity sensing is used, the seal 2 continues to self-check the integrity of the cable 6 every few seconds even after tampering, and if none or both detectors 14, 16 at some stage start to receive optical signals again, then the microprocessor 18 records the time and the detector in the memory 19, but the security status remains "tampered with".

Directly after each check of the integrity of the cable 6, the processor 18 instructs the transmitter 22 to emit an IR or visible beacon signal in encrypted and password-protected form. The beacon signal is emitted as one or a series of about 10 $\mu$s pulses at regular ca. 1 sec intervals (intermittently) directly after each seal self-checking operation.

After each self-checking operation and beacon transmission, the seal 2 shuts down, i.e., becomes dormant, until the regular time interval (e.g., every 1 sec or so) elapses when the seal 2 reactivates to repeat the process. The seal 2 therefore is inactive for most of the time. This decreases power consumption and increases the life of the battery 20 and also the seal 2 itself if the battery is non-replaceable.

To interrogate the seal, the device 40 is brought to within a few metres of seal 2 and instructed to take a reading by the operator via keypad 50. The regular beacon signal from the seal 2 can then be read by the reading/programming device 40 via its detector 44, allowing location of and synchronisation with the seal 2, this fact being displayed via a display 52 or via a flashing LED (not shown). The reading device 40 then immediately (e.g. within 1 $\mu$s to 10 ms, typically within 1 ms) emits an acknowledgement signal containing the or a device password and ID number which is detected and recorded by the seal 2. If the password is acceptable by the seal, the seal 2 then enters into a continuous two-way communication with the device 40 and transmits to the device 40 the data requested by it, the data transmitted depending on the security level of the device password received. This data can include the seal identification number 15, the contents of the container, the origin and/or destination, the time at which the seal was armed and/or locked; the security status of the seal 2, the time(s) of tampering (if any), the time(s) when the integrity of the optical fibre was re-established (if at all), and/or any other relevant information (e.g. time(s) of scanning by reading devices and/or their ID numbers, time interval between pulses, battery low, etc).

The seal 2 only needs to be active for a short time (e.g. a few milliseconds, e.g. 1 ms) after the beacon signal to detect whether it has been read. If no device acknowledgment signal is received, or after any communications with the device are finished, the seal 2 shuts down until it is time for the next beacon.

In this way, the operator of reading device 40 can investigate the security status, et al, of the seal 2. The seal 2 records the fact that it has been scanned, the time of scanning, and the device ID number in memory 19.

The reading/programming device 40 can also instruct the seal 2 to disarm itself by transmitting a disarm password (and if applicable, also to unlock itself) when the container has reached its destination and/or to investigate the contents of the container if tampering has occurred.

When disarmed, the seal 2 is inactive (to maximise battery life). The seal 2 can be reused.

The seal 2 can be instructed to perform different actions by means of a hierarchy of different passwords, each password being for a specific instruction/action, e.g. arming, disarming, transmitting security status data or container contents, etc. Different devices 40 can be provided with differing arrays of passwords, thereby varying their functionality.

Passwords used in the currently preferred embodiments of the invention are 64 bits in length, so that obtaining the password by trial and error is exceedingly unlikely. The microprocessor may be programmed to require several passwords, each for a different activity—e.g. arming the seal, disarming the seal, reading the memory, writing to the memory, scanning seal integrity etc. In such a seal there may be provided a roaster password which is required in order to change tie other passwords. Optionally, however, the microprocessor may be programmed to erase the contents of the memory upon receipt of the master password so that even if an unauthorised person obtains the master password, this still does not provide access to the contents of the memory.

The various passwords, code-words, and even the identification/serial numbers used by seal 2 and reading/programming device 40 may be generated at random and transmitted and read automatically by a secure computer network 70, 80 without being known to any human operators. This eliminates collusion and makes it more difficult for tampering with the seal to go undetected.

In alternative embodiments of the invention, seals and/or reading/programming devices are provided substantially identical to the seal 2 and device 40 described hereinabove, with the following modifications.

Firstly, modifications of seal 2 are considered. In one embodiment, the flexible coaxial cable 6 is replaced with a rigid member, e.g. a padlock hasp. The seal 2 can be a modified padlock.

In one alternative embodiment of seal 2 (not shown), one end (7 or 9) of the cable 6 is fixed to the housing 4 (no ferrule provided at tat end), and the lock 12 arid/or lock member(s) are adapted to lock the other releasable end (9 or 7) in position when received in its recess 28 or 30.

In another embodiment of seal 2, the sacrificial latching mechanism 12 is replaced with an internal solenoid mechanism which is locked simultaneously with arming of the seal 2 and which releases the cable 6 on receipt of a coded password from a microprocessor. This provides the seal with a releasable re-usable lock (no need to provide a new sacrificial part each time) but this consumes more power and so is most suitable to a large seal with a large battery attached to a vehicle. In a further embodiment sacrificial lock 12 is replaced with a releasable key-operated lock.

The sacrificial latching mechanism 12 may alternatively be replaced with a combination lock, operable manually. Such locks are of course well known. In such an embodiment the combination can optionally be recorded on the memory, access to the lock preferably being password protected.

Figure 5:
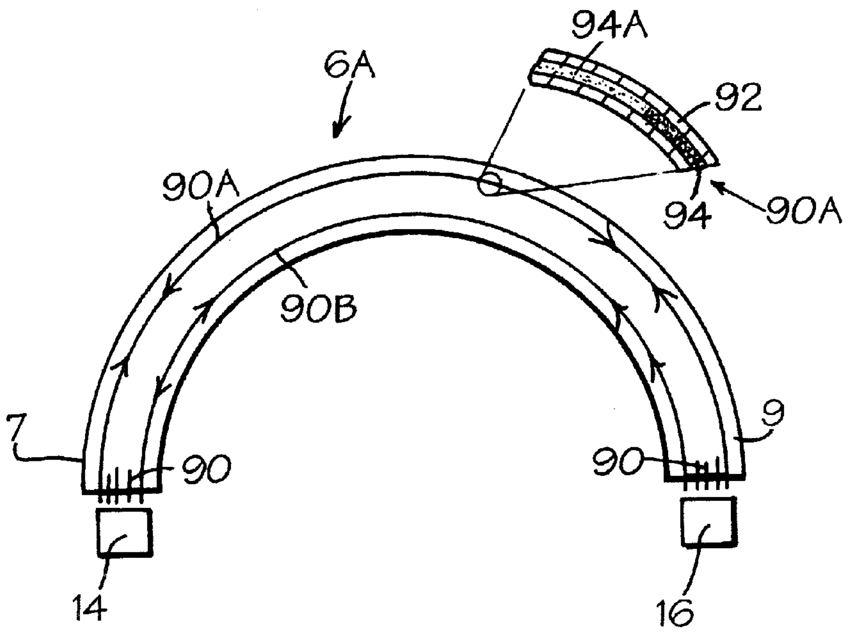
FIG. 5 is a diagrammatic sectional view of an alternative construction of coaxial cable which can be used with the electronic seal of FIG. 1.

In an alternative embodiment shown in FIG. 5, the flexible coaxial cable 6 of seal 2 is replaced with the flexible coaxial cable 6A comprising a plurality of interwoven (entwined) major strands 90. Two (alternatively more than two) of the major strands 90A, 90B comprise an outer sheath 92, e.g. formed from a plurality of interwoven minor strands of steel wire, enclosing a central core comprising an optical fibre 94, 94A of the same construction as optical fibre 10,10A (i.e. a cladding 94A enclosing a transparent core 94). Therefore each of the major strands 90A, 90B is of the same construction as cable 6. In this embodiment, more than one optical fibre 94, 94A is contained in a single coaxial cable 6A, and the integrity of each optical fibre is checked by the seal 2 (as described above), making this embodiment harder for a thief to tamper with without detection.

Alternative embodiments of the reading and programming device 40 are now discussed.

In one alterative inexpensive embodiment, device 40 may just be a reader, in which case it would only receive the intermittent beacon signal 5 via detector 44 transmitted by the transmitter 22 of seal 2. This beacon may include simple information as to whether or not the seal 2 has been tampered with.

In another embodiment (not shown), the reading and programming device 40 is replaced with an arming device, with a unique serial number and erasable memory and password, which is similar to device 40 but is adapted to arm the seal 2 by bringing the arming device up to the seal 2 (e.g. contacting the seal 2) and which arming device is adapted to itself be disarmed on arming the seal 2 by receipt of a signal from the seal 2 which erases the password of the arming device. The arming device is therefore a cheap single-use item which can replace the arming function of the reading/programming device 40. The seal 2 and arming device each have a conducting sensor surface (not shown) on the outside of their respective housings which can be brought into contact so that signals can pass in both directions.

In this alternative embodiment, the seal 2 is armed by contacting the conducting sensor surface of the single-use arming device with the conducting sensor surface of the seal 2, or alternatively by IR/visible communication between the arming device and the seal 2. The arming device sends an electrical (or alternatively IR/visible) password protected and encrypted signal to seal 2, and the microprocessor 18 de-encrypts the signal, checks the password, records the device serial number and the time, and arms and/or locks the seal 2, as above. Additionally, when the seal 2 sends a return acknowledgement signal to the arming device, this has the effect of erasing the password of the arming device, so that the arming device can no longer be used. This single-use arming device is simple and cheaper than reading/programming device 40 and is therefore better adapted for wide distribution to all locations where the container will be sealed and dispatched, and for use by untrained operators. It also avoids possible abuse.

Figure 6:
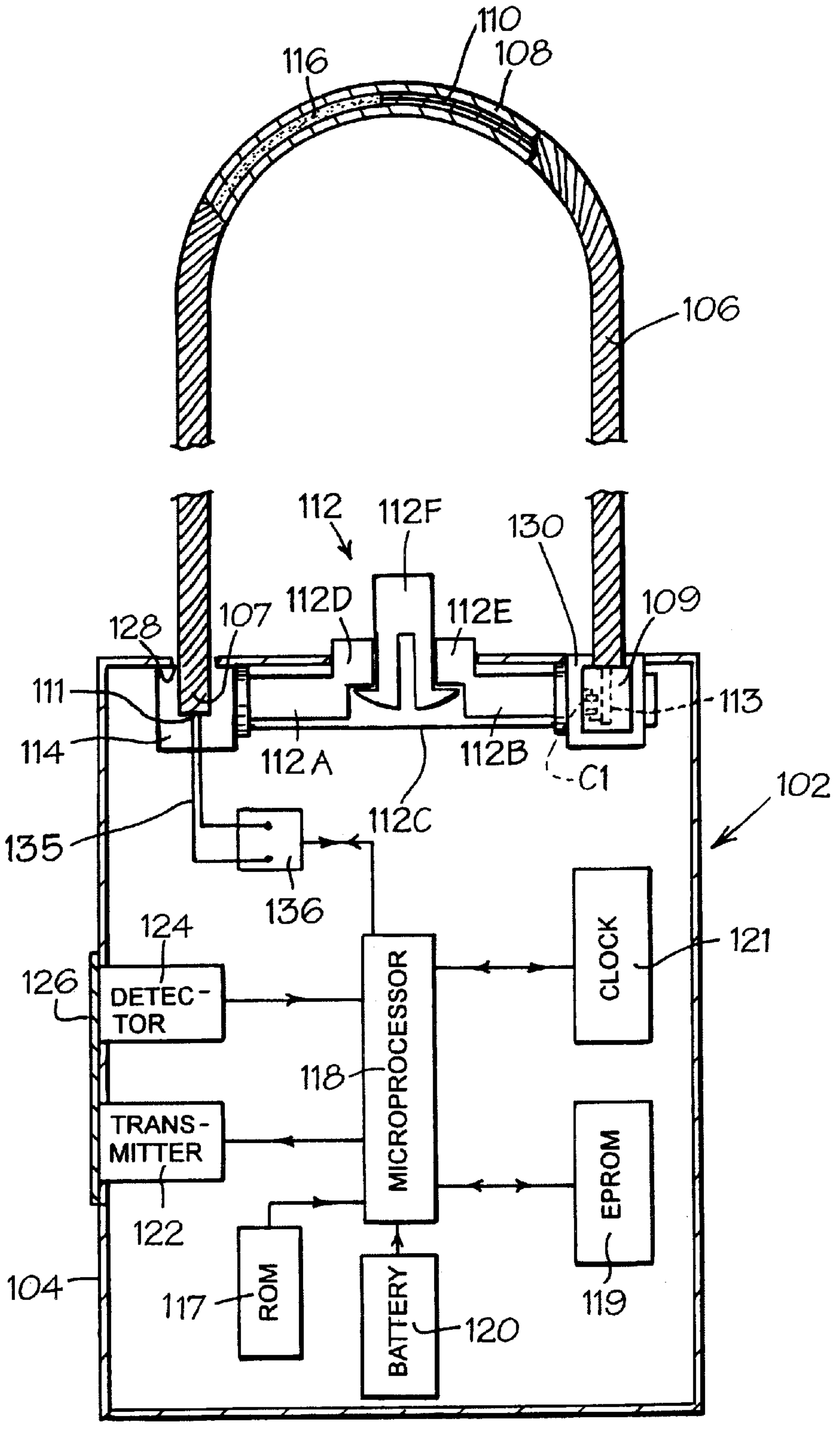
FIG. 6 is a cross-sectional view of a second embodiment of electronic seal in accordance with the present invention.

A second major embodiment of the invention is illustrated in FIG. 6. The embodiment is very similar to the previous embodiments in FIGS. 1 to 3 and like features have been identified with like reference numerals, increased by 100. In this second major embodiment, an electronic seal 102 comprises a housing 104 containing microprocessor 118, erasable programmable read-only memory 119, clock 121, power source 120, and visible/IR transmitter 122 and visible/IR detector 124 adjacent optical window 126 similar to in FIG. 1. A flexible coaxial cable 106 is fixed at one end 107 to the housing 104 by a fixture 114, passes out through an opening 128 in the housing 104, and the other (releasable) end 109 is adapted to be received within a recess 130 and to be releasably locked in position therein by lock member or members of elongate lock 112.

In FIG. 6, the coaxial cable 106 comprises a coaxial cable in the form of a steel outer sheath 108, enclosing a central core 110 comprising a wire or other conductor capable of storing charge. The sheath 108 and core 110 are separated and electrically insulated from each other by a thin insulating tube 116. Core 110 terminates just before the releasable end 109 of the cable at a core end 113 encapsulated within and insulated (by tube 116) from the outer sheath 108. In this way, core 111 and sheath 108 together form a capacitor, the capacitance C of which depends on the length of the cable 106.

The fixed end 111 of the inner core 110 and the fixed end 107 of the outer sheath 108 are electrically connected by circuitry 135 to opposite terminals of an input/output device (e.g. pin) 136 of the microprocessor 118.

In operation, the releasable end 109 of the cable 106 is passed through an aperture in a lug or catch of the closure member of the container to be sealed, to prevent the closure member being opened, and disposed fully into recess 130. The seal 102 is locked and armed as described hereinbefore.

When the seal 102 is locked and armed, at regular intervals (approx every 1 second) the microprocessor 118 sets the input/output (I/O) device 136 to output a (say) 5 volt output which charges up the cable capacitor 108, 110 to a predetermined charge and voltage (defining the sheath as ground). A few microseconds later, after the capacitor is fully charged, the processor 118 resets the I/O device 136 to input mode and the cable capacitor 108, 110 discharges via the I/O device 136 into a second capacitor (not shown) inside he processor 118. The processor 118 measures how quickly the capacitor voltage V decays, i.e. measures a decay curve.

In general, the shorter the cable, the lower the capacitance C, and the quicker the voltage V decays. For known parameters of an intact cable, the decay curve will be predictable and either programmed into the processor 118 or measurable by the processor 118 immediately after arming or both.

The processor 118 makes charge-discharge measurements every one second or so and in this way self-checks the integrity of the cable 106 at regular intervals. As long as the decay curve remains the same, then the cable is unlikely to have been cut. However, if the cable 106 is tampered with, then the capacitance C of the cable will be affected, which will manifest itself in a different voltage decay as measured by the processor 18. This change is recorded by the processor 118 which refers to clock 121 and records in memory 119 that tampering occurred and at what time.

A small capacitor C1 (illustrated schematically in dotted lines) may also be connected between the releasable end 113 of the core 110 and the releasable end of the outer sheath 108. This gives the releasable end 109 of the cable 106 a significant capacitance, such that if the cable is cut near to that end 109, the change in capacitance will be significant, i.e. readily measurable by the processor 118.

In another variation of FIG. 6, the releasable end of the outer sheath 108, or a ferrule connected thereto, may be slidingly engageable with the walls of the recess 130, which walls are made of a conductor (e.g. metal) and which therefore form part of the total capacitance of the system when the cable 106 is engaged in the recess 130 In this way, there will be a measurable change in capacitance if a thief releases the cable 106 without cutting it.

Figure 7:
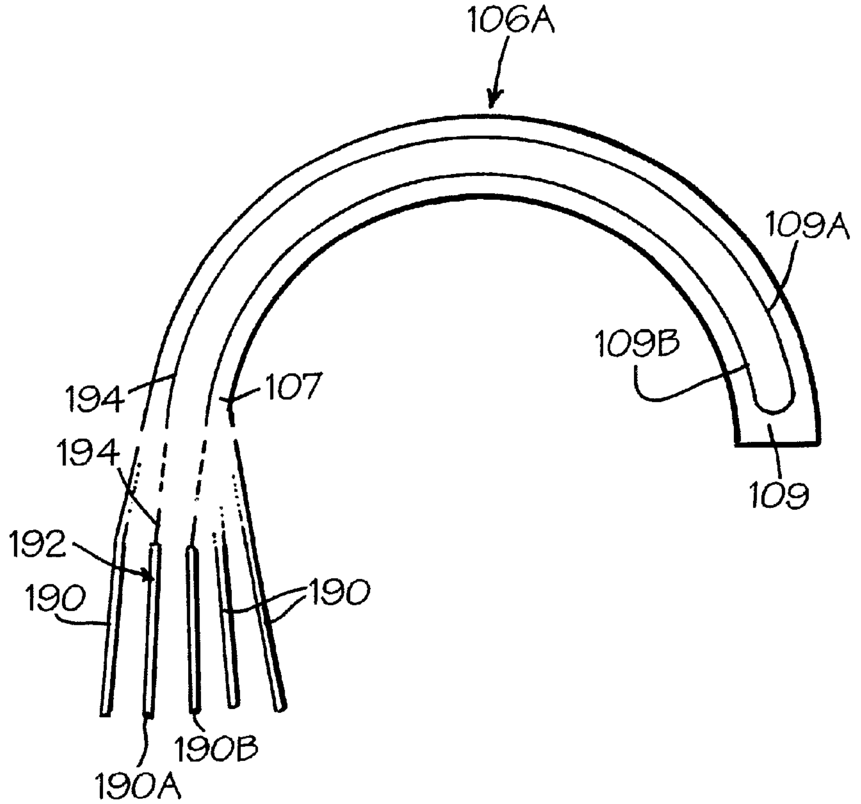
FIG. 7 is a diagrammatic sectional view of an alternative construction of coaxial cable which can be used with the electronic seal of FIG. 6.

In a further variation of FIG. 6, illustrated in FIG. 7, the flexible coaxial cable 106A comprises a plurality of (e.g. 5 or 6) woven (entwined) major stands 190. Two of the major strands 190A, 190B each comprise an outer sheath 192, e.g. formed from a plurality of woven minor strands of steel wire, enclosing a central conducting core 194. Core and sheath are separated by an insulating tube (not shown) as above. These two major strands 190A, 190B are integrally joined at the releasable end 109 of the cable 106A, i.e. together they comprise a single strand in the form of a loop 109A, 109B extending from fixed cable end 107 to the releasable cable end 109 and then back to the fixed cable end 107. The remaining major stands 190 are dies but still contain sheaths and central cores. This embodiment is even harder to tamper with without detection as a person stripping the cable does not know which strands are live and should be bypassed before cutting of the cable 106A.

The seal 102 can communicate with and be programmed with or read by a reading/programming device 40 or a single-use arming device as described hereinabove.

The invention is not restricted to the details of the foregoing embodiments.

What is claimed is:

1. An electronic seal comprising:

a closure member comprising an outer portion surrounding at least one core, and a housing co-operable with the closure member to form a connection to close the seal;

means for sensing the integrity of the core and for providing data output;

a microprocessor for receiving and processing said data output, and an infra-red beacon, controllable by the microprocessor, for transmitting the processed data output to a remote reading device, wherein the microprocessor activates the means for sensing the integrity of the core at pre-determined intervals and records any change of state in the seal as an event in a memory and causes the infra-red beacon to broadcast a synchronization signal to initiate communication with the remote reading device.

2. An electronic seal as claimed in claim 1 wherein the core comprises an optical fiber.

3. An electronic seal as claimed in claim 1 wherein the means for sensing the integrity of the core comprises an optical emitter arranged to emit an optical signal into the core and an optical detector arranged to detect a signal from the core.

4. An electronic seal as claimed in claim 3 wherein the optical emitter and optical detector are connected to control electronics for causing the optical emitter to emit a time varying signal and for monitoring the output from the detector to establish whether a corresponding signal is received.

5. An electronic seal as claimed in claim 4 wherein the time varying signal is a pulsed signal.

6. An electronic seal as claimed in claim 1 where the core comprises at least one electrical conductor connectable to a terminal of an electrical power source, the outer portion comprises an electrical conductor which is connectable to the opposing terminal of the power source and is insulated from the core electrical conductor thereby providing a capacitance between the terminals of the power source, and the means for sensing comprises means for measuring a characteristic of the capacitance.

7. A method of communication for the seal of claim 1, comprising the steps of:

(a) activating the means for sensing the integrity of the core at pre-determined intervals;

(b) sensing the integrity of the core and providing data output;

(c) receiving and processing the data output;

(d) recording any change of state in the seal as an event in a memory;

(e) broadcasting a synchronization signal from the infra-red beacon to initiate communication with the remote reading device; and (f) transmitting th[0085] processed data output to the remote reading device.

8. The method of claim 7 wherein the signals are transmitted a regular intervals.

9. The method of claim 7 wherein the signals are transmitted at irregular or random intervals within a fixed time range.

10. The method of claim 7 wherein the signals are transmitted at intervals of about 0.1 to 1 second.

11. The method of claim 7 wherein some or all of the signals comprise one, two or more consecutive pulses.

12. The method of claim 7 further comprising deactivating the seal after transmission.

13. The method of claim 12 wherein activation of the seal followed by deactivation is repeated at regular intervals.

14. The method of claim 12 further comprising transmitting a second signal from the device to the seal during a predetermined period after transmission of said signals and before deactivation of the seal.

15. The method of claim 14 wherein the second signal contains a password, and wherein said method includes checking that the password is acceptable, and subsequently transmitting third signal containing password-protected data stored by the seal from the seal to the remote reading device only if the password is acceptable.

16. An electronic seal as claimed in claim 1, wherein the microprocessor is programmed to de-activate after a predetermined interval and then reactivate after a further predetermined time if it does not detect a pre-arranged response from the reading device.

17. An electronic seal as claimed in claim 1 wherein the microprocessor is pre-programed with a 48-bit identification number.

18. An electronic seal as claimed in claim 1 wherein the synchronization signal is a pre-arranged sequence of pulses which disclose the security state of the seal.

19. An electronic seal as claimed in claim 1 wherein the remote reading device is capable of responding to the synchronization signal to:

determine the security state of the seal, read an identification number of the seal, write to or read from the memory of the seal, and program the operation of the seal.

20. An electronic seal as claimed in claim 1 wherein said memory is capable of holding details of any transaction with the reading device and an identification number of that reading device.

21. An electronic seal as claimed in claim 1 wherein events are recorded in the memory and said events are time and date stamped to provide a chronological history of those events and transactions with readers.

22. An electronic seal as claimed in claim 1 wherein said closure member is locked in position by an electrical lock controlled by the microprocessor which can only be opened or secured by means of a reader transmitting to the seal a password.

23. An electronic seal as claimed in claim 1 wherein said closure member is locked in position by a mechanical combination lock whose combination number can be recorded and/or read from the seal's memory using a reader with a password.

24. An electronic seal as claimed in claim 1 wherein said closure member contains at least one optical fiber, the optical transmittance of which is measured at random intervals by the microprocessor to determine whether the seal is open, closed or has been tampered with.

25. An electronic seal as claimed in claim 1 wherein the closure member contains at least one coaxial cable, the capacitance and/or conductance of which is measured at random intervals by the microprocessor to determine whether the seal is open, closed or has been tampered with.

* * * * *